Aug. 21, 1934.     P. TRACY     1,970,675
NONCOLLAPSIBLE INFLATION TUBE FOR PNEUMATIC TIRES
Filed Aug. 30, 1933
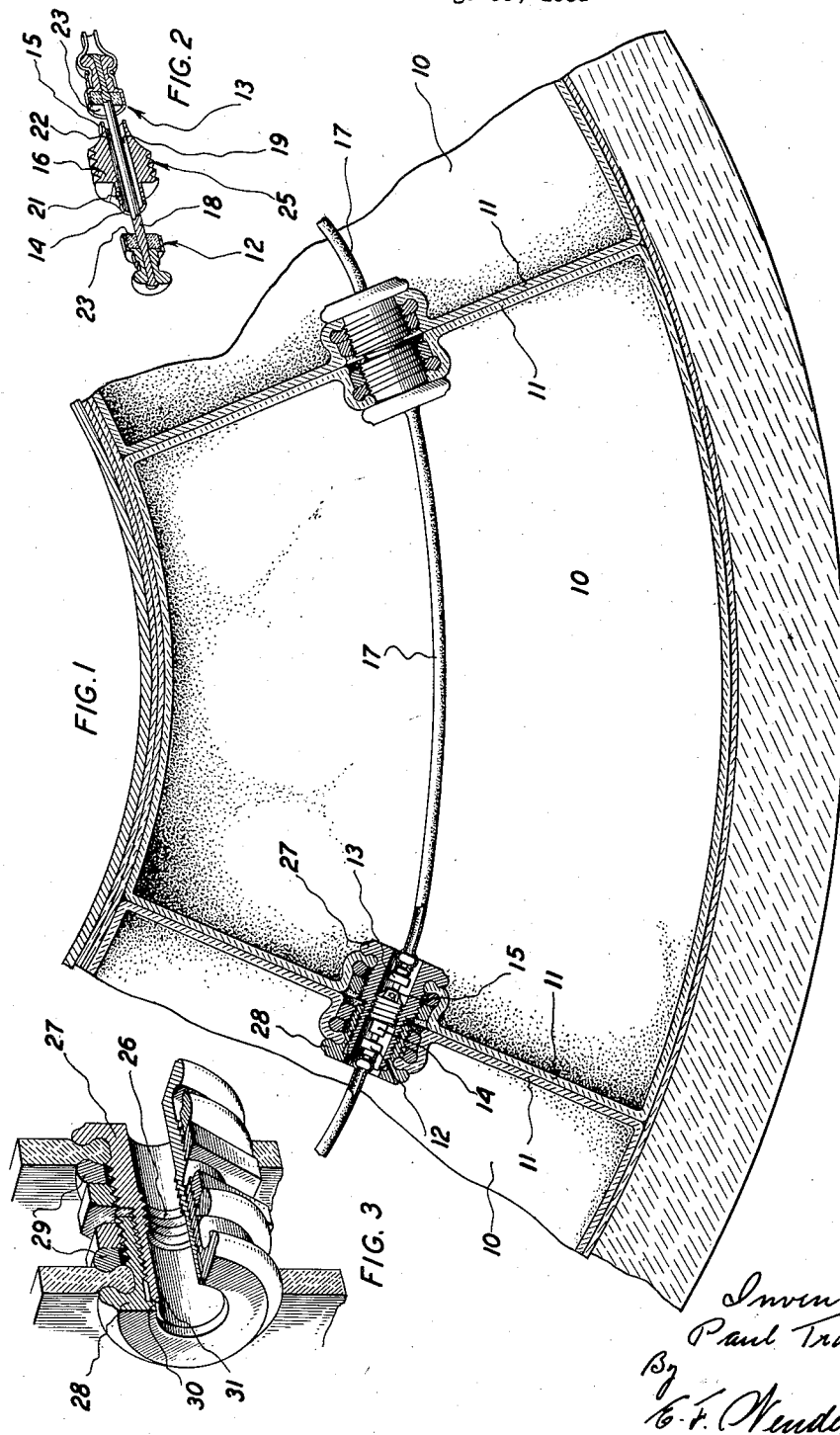

Patented Aug. 21, 1934

1,970,675

UNITED STATES PATENT OFFICE 1,970,675

NONCOLLAPSIBLE INFLATION TUBE FOR PNEUMATIC TIRES

Paul Tracy, Rydal, New South Wales, Australia

Application August 30, 1933, Serial No. 687,503
In Australia September 6, 1932

2 Claims. (Cl. 152—22)

This invention consists in an improved form of sectional inflation tube for pneumatic tires.

The inflation tube is constituted of several (eight, more or less) independent tube segments which are interconnected by valved couplings on their ends and are disposed end to end in the tire cover to form the complete tubular ring which fills the cover. In normal circumstances the interconnecting valves are open so that air pressure may equalize freely through all the segments. One charging valve suffices for all segments in the group, and the tube is, therefore, usable on standard rims.

Each tube segment is fitted with one member of a screw union in each end of it for coupling it to a complementary member which is fitted to the end of the neighboring tube segment. A valve body is screwed into the inner member of each of these unions; it has a centre hole through it and its ends have valve seats formed in them. A small bore by-pass through the valve body allows passages of air between the several tube sections to permit air to pass for inflation and deflation purposes, but its main function is to permit deflation evenly all round at a slow rate when the air is locked up tight in all the other segments, a condition consistent with a "blow out". Flexible cords which extend lengthwise of the segment tubes are connected to valve heads which coact with each of the valve seats. These cords, connected by the respective valves which are double-ended, make a continuous line extending through all the tube segments.

The valve heads set normally clear of the valve seats when the tube is inflated and thus allow free air circulation for equalization between all the tubes. In the event of any tube segment being punctured or burst, it collapses; immediately such collapse occurs the adjacent tubes distend endwise and the space left vacant by the collapse is thus refilled. In the distending movement the cord is drawn taut in the sound tubes with the result that the valves at the ends of the segments next the failed segment are drawn hard up against their seatings, thereby locking the air in the sound tubes. This air is liberated at a very slow rate through the leak holes which enter the bore by-passes of the valves, and the tire is thus permitted to deflate slowly, thereby to avoid sudden interference with steering control or car stability, and mutilation of tubes and covers by running on them whilst in fully deflated condition.

Flexible rubber cords are preferably used for the valve coupling lines. These cords distend with the tubes to allow for the length of the collapsed section, but they apply sufficient tension on the valves in the segment ends next the failure to hold them tightly on their seats.

Passage of air from tube to tube during inflation and deflation may take place freely, because the valves seat only when pressure is lost in one or more of the segment tubes as a consequence of puncturing or bursting or by splitting by pinching.

In the accompanying drawing:—

Fig. 1 is a longitudinal section through portion of a pneumatic tire in which the invention is embodied; it shows one tube segment with the adjacent end portions of the two neighboring segments and the valves in the unions by which these segments are connected end to end;

Fig. 2 is a sectional perspective view of one of the double end valves; and

Fig. 3 is a sectional perspective view of one of the unions with the tube segments held in it.

The inflation annulus is composed of a number of flexible rubber tube segments 10, grouped together end to end in the annulus which is enclosed between the wheel rim and the tire cover. When the inflation annulus is blown up, the end walls 11 of the segments 10 flatten against each other and mutually support each other, and the valve heads 12 and 13 are not constrained to their seats 14 and 15 on the ends of the valve body 16, the elastic coupling cords 17 being in these circumstances not stretched so as to draw these valves up to their seats. The metal stem 18 which connects the respective heads in each pair valve runs through a centre aperture 19 in the valve body 16 with adequate clearance through which air may blow evenly from each segment to the adjacent segment. In the neck portion of the valve bodies rearward of the valve seats 14 and 15 two very small holes 21 and 22 are drilled to provide passageways for air to leave a segment which has been closed by the seating of the valve in that segment. The valve heads 12 and 13 carry packings 23 which are adapted to make airtight joints with the seats 14 and 15. The flexible cords 17 are preferably tubular and their ends are secured to the respective ends of the valves. To facilitate fastening, the valve ends are provided with button heads, and the ends of the flexible cords are sleeved over these heads and bound as seen in the righthand portion of Fig. 2. Other means of securing cords to the valve stem 18 may be used.

The body portion 16 of each valve is screwed externally as shown at 25, and it is screwed into the tapped portion 26 in the spigot member 27 of the union (Fig. 3) by which the adjacent ends of neighboring tube segments are fixed together. The spigot member 27 is screwed into the socket member 28 of the union so as to embrace the lips of circular apertures in the ends of the tube segments against collars or back nuts or filler rings 29, thus to make airtight connections at the tube segment ends.

To prevent escape of air through the coupling union the spigot member 27 is cone shaped at its small end 31, and when screwed up against the shoulder 30 of the socket member 28 forms an airtight joint. A packing washer may be used as an alternative method of making the union airtight.

A nipple of the usual kind is fitted in one of the segments to enable inflation and deflation by pump.

The operation of the arrangement is as follows: When blown up, the segmental tubes fill the annulus within the cover and butt flatly against each other endwise as seen in Fig. 1, and the valves are not constrained to their seats as there is no tension on the cords which connect them. If a puncture or split or burst occurs in any segment that segment collapses more or less quickly; the other segments having lost end abutment then move up and crumple the collapsed segment and fill the space which it occupied when inflated. In this endwise movement of the sound segments, the cords 17 in those segments are stretched so that they pull all the valves to their seats, thus closing communication between the sound tubes by checking flow of air out of them past the valves. But the small holes 21 and 22 which always remain open permit air to leak slowly out of the sound tubes serially towards the burst tube, and the tire is thus caused to deflate slowly, notwithstanding that the failure has occurred in a burst of large area which would result in sudden collapse of tire having an inflation tube of the continuous conventional type. Injury to the inflation and to the tube will thus be avoided as the vehicle may be brought to rest before flattening of the tire tread has occurred, and risk of loss of steering control or car stability is obviated.

What I claim as my invention and desire to secure by Letters Patent is:—

1. An inner tube for a pneumatic tire consisting of a ring series of flexible rubber tube segments with closed ends adapted to abut and adapted to be embraced in a tire cover, unions connecting the adjacent ends of said tubes, a double end tubular valve body in each union, said body having a longitudinal passage through it, a flexible line in each segment connecting valves which coact with seats on the respective ends of said valve body, said valves each having a head at each end and a stem connecting the respective heads of it, said stem movable with clearance in the passage in the valve body, and a small leak hole in the neck of each seat of said valves adapted to pass air via said passageway between adjacent tube segments when the valve is closed.

2. An inner tube for a pneumatic tire, consisting of a ring series of flexible rubber tube segments, coupling valves between adjacent ends of the respective segments, and extensible cords connecting said valves, characterized in that the valves remain normally open but are closed by the tensioning of the connecting cords consequent on deflation of any segment and that a permanent leak connection of limited area remains always open through the body of each of said valves.

PAUL TRACY.